United States Patent [19]

Kadota

[11] Patent Number: 5,635,633

[45] Date of Patent: Jun. 3, 1997

[54] SELF-DIAGNOSIS APPARATUS USING A PRESSURE SENSOR

[75] Inventor: Yoichi Kadota, Tokyo, Japan

[73] Assignee: Mitsubishi Denki Kabushiki Kaisha, Tokyo, Japan

[21] Appl. No.: 603,269

[22] Filed: Feb. 20, 1996

[30] Foreign Application Priority Data

Apr. 20, 1995 [JP] Japan .................................. 7-095017

[51] Int. Cl.$^6$ .............................. F02D 45/00; F02M 25/07
[52] U.S. Cl. .......................... 73/118.1; 123/571; 123/520
[58] Field of Search ........................... 73/115, 116, 117.2, 73/117.3, 118.1, 118.2, 40.5 R, 49.7; 123/568, 571, 518, 519, 520, 521

[56] References Cited

U.S. PATENT DOCUMENTS

| 4,620,440 | 11/1986 | Thompson | 73/118.1 |
| 4,671,107 | 6/1987 | Chiesa et al. | 73/118.1 |
| 5,103,655 | 4/1992 | Kano et al. | 73/118.1 |
| 5,207,093 | 5/1993 | Maeda | 73/118.1 |
| 5,257,534 | 11/1993 | Azuma et al. | 73/118.1 |
| 5,317,909 | 6/1994 | Yamada et al. | 73/118.1 |
| 5,474,051 | 12/1995 | Matsumoto et al. | 73/118.1 |
| 5,513,616 | 5/1996 | Matsumoto et al. | 73/118.1 |

FOREIGN PATENT DOCUMENTS

| 62-51746 | 3/1987 | Japan . |
| 5-312111 | 11/1993 | Japan . |
| 6-167236 | 6/1994 | Japan . |
| 6-249079 | 9/1994 | Japan . |
| 6-249084 | 9/1994 | Japan . |

*Primary Examiner*—George M. Dombroske
*Attorney, Agent, or Firm*—Sughrue, Mion, Zinn, Macpeak & Seas

[57] ABSTRACT

A self-diagnosis apparatus performs a failure diagnosis of a control unit equipped with a pressure sensor based on an output thereof a pressure sensor. The apparatus performs the failure diagnosis after the elapse of a predetermined period from the time when the output of the pressure sensor has changed by a predetermined quantity.

8 Claims, 9 Drawing Sheets

OUTPUT RANGE OF PRESSURE SENSOR

○ EXISTING PRESSURE RANGE

○ OUTPUT RANGE OF PRESSURE SENSOR

○ PRESSURE RANGE USED IN FAILURE DIAGNOSIS

○ OUTPUT RANGE OF PRESSURE SENSOR WITH RESPECT TO PRESSURE RANGE USED IN FAILURE DIAGNOSIS

FAILURE JUDICABLE OPERATIVE AREA

SELF-DIAGNOSIS APPARATUS USING A PRESSURE SENSOR

BACKGROUND OF THE INVENTION

1. Field of the Invention

The present invention relates to a self-diagnosis apparatus which performs a diagnosis of failure in a control unit provided with a pressure sensor, such as an exhaust gas recirculation (hereinafter referred to simply as an EGR) control unit and a purge control unit for an engine of an automobile, by use of an output signal of the pressure sensor.

2. Description of the Related Art

For example, a self-diagnosis apparatus is disclosed in Japanese Laid-Open Publication No. SHO 62-51746 and it is known as a self-diagnosis apparatus which is provided in a control unit having a pressure sensor and performs a failure diagnosis of the control unit, based on an output signal of the pressure sensor. The self-diagnosis apparatus, disclosed in this publication, relates to a self-diagnosis apparatus for an EGR control unit and performs a failure diagnosis of an EGR valve by means of a pressure sensor mounted on an intake pipe. This self-diagnosis apparatus also performs failure judgment of the pressure sensor itself, such as failure judgment of a broken line and a ground fault of a signal detection line of the pressure sensor, by judgment (judgment of upper and lower limit values) of the sensor output level.

In addition to the aforementioned EGR control unit, a purge control unit is known as a control unit using a pressure sensor. In this purge control unit, a pressure sensor is provided in a fuel tank where an evaporated fuel or fuel vapor is generated, and a failure diagnosis of the purge control unit is performed by checking for leakage of fuel vapor by means of the pressure sensor.

A self-diagnosis apparatus such as this is required to perform self-diagnosis with high reliability. Therefore, for this purpose, a measure to counter freezing of the pressure sensor is necessary so that a mistaken failure judgment is not made even at the time of the freezing of the pressure sensor, but such a measure has thus far been unsatisfactory.

That is, for example, the EGR control unit has the possibility that water gets into the intake pipe, and consequently, there is the possibility that water adheres around the pressure sensor attached to the intake pipe. If, with the condition water adhered, in a cold district a vehicle is left for a long period of time after the engine is stopped, then it will be predicted that the water on or around the pressure sensor will be likely to freeze.

Normally, a semiconductor-type pressure sensor has a strain gage at its pressure sensing portion for sensing an intake pressure by detecting a tensile force in this portion and then converting it into an electric signal. However, if water adheres in the vicinity of this strain gage, then the strain gage will come to be subjected to the tensile force as ice will be formed, and a change in the intake pipe pressure will not be transmitted. Consequently, there is the problem that there are some cases where the intake pressure can not be detected.

Also, the self-diagnosis apparatus needs to be constructed at a low cost. Therefore, it is necessary to fabricate the pressure sensor at a reduced cost. In a control unit originally provided with a pressure sensor, such as an EGR control unit, the use of such a pressure sensor is effective in reducing the overall cost of production.

However, the absolute accuracy required of the pressure sensor of the EGR control unit will be sufficient if it is such that a change in pressure can be detected when the EGR control unit is turned on and off, and consequently, if this sensor is evaluated from the aspect of failure judgment, then an inexpensive pressure sensor will tend to be employed in cases where a downgraded specification such as a drift in a sensor output is allowed. Therefore, if such a pressure sensor is directly used to detect breaks, ground faults and the like of the sensor detection signal line by means of the judgment of the upper and lower limit values of the sensor outputs (judgment where a value of judgment is set to a pressure value which does not actually exist), then a sensor output value of an actually existing pressure of the intake pipe will often exceed an allowable range of the aforementioned upper and lower limit values because the drift in the sensor output is large and the absolute accuracy is low. As a result, there are some cases where it becomes difficult to perform the failure judgment of the sensor itself with reliability.

Also, the purge control unit, described as another control unit, is used so that an evaporated fuel (purge gas) from the fuel tank is absorbed by a canister, then it is supplied to the engine for combustion without being discharged to the ambient atmosphere. In a self-diagnosis apparatus for this purge control unit, a pressure sensor is provided in a fuel tank for checking for leakage of evaporated fuel or purge gas, and the pressure of the purge gas is detected by this pressure sensor.

Even in such a self-diagnosis apparatus for a purge control unit, while the cost of manufacture has been reduced by utilizing the pressure sensor originally provided in the purge control unit, the same problem as with the case of the aforementioned EGR control unit occurs, because the pressure sensor, which is originally used in this purge control unit, similar to the pressure sensor originally used in the EGR control unit, is a pressure sensor whose absolute accuracy is rather low just enough to detect a relative pressure.

SUMMARY OF THE INVENTION

Accordingly, the present invention is intended to obviate the above-described problems and has for its object to provide a self-diagnosis apparatus of the kind as described above which is capable of diagnosing a control unit with high accuracy and which at the same time can be manufactured at a reduced cost.

According to one aspect of the invention, there is provided a self-diagnosis apparatus for diagnosing a control unit equipped with a pressure sensor, the apparatus comprising: first means for detecting a quantity of change in an output signal from the pressure sensor; second means for detecting the lapse of a predetermined time after the quantity of change in the output signal of the pressure sensor exceeds a predetermined value; and third means for diagnosing a failure in the control unit based on the output signal of the pressure sensor after the lapse of the predetermined time from the time the quantity of change in the output signal of the pressure sensor exceeds a predetermined value.

With this arrangement, the output change in the pressure sensor is detected so that the failure diagnosis of the control unit is carried out after the lapse of the predetermined period of time from the time the quantity of change in the output signal of the pressure sensor exceeds a predetermined value. Thus, when the pressure sensor has frozen, the failure diagnosis of the control unit is not carried out, and the failure diagnosis where the reliability is low can be prevented from being performed by means of the frozen pressure sensor.

In a preferred form of the invention, the control unit is an exhaust gas recirculation (EGR) control unit which comprises an EGR passageway for recirculating an exhaust gas of an engine from an exhaust pipe to an intake pipe, and an EGR controller provided in the EGR passageway for controlling a quantity of EGR gas which is supplied to the engine through the EGR passageway, the pressure sensor being mounted on the intake pipe for detecting a pressure of intake air in the intake pipe.

In another preferred form of the invention, the control unit is a purge control unit which comprises a purge passageway for supplying a fuel gas evaporated in a fuel tank to an intake pipe of an engine, a canister disposed in the purge passageway with an absorbing agent received therein for absorbing and collecting the evaporated fuel gas, and a control valve disposed in the purge passageway for controlling the supply of the evaporated fuel gas from the canister to the intake pipe, the pressure sensor detecting an internal pressure of the fuel tank.

In a further preferred form, the time at which the failure diagnosis starts is changed depending upon a temperature of the engine or a temperature of intake air in the intake pipe.

With this arrangement, the time from the output change in the pressure sensor (start of removal of freezing) to the start of the failure diagnosis is varied depending upon the engine temperature. Accordingly, freezing of the pressure sensor can be removed with higher reliability. In this connection, it is to be noted that, when the frozen water on or around the pressure sensor begins to melt, it has been experimentally confirmed that there are some cases where the output of the pressure sensor changes temporarily and it takes some time for the output of the pressure sensor to return to a normal value after the output change.

In a further preferred form, the invention, the failure diagnosis is performed when the engine temperature or intake air temperature is higher than a predetermined temperature.

With this arrangement, the failure diagnosis can be limited to an operative area where the measurement area of the pressure sensor becomes optimum in respect of accuracy, and consequently, reliability in the failure diagnosis would be maintained even if an inexpensive pressure sensor which has a relatively large drift in its output and hence a low absolute accuracy were employed.

BRIEF DESCRIPTION OF THE DRAWINGS

The present invention will be described in further detail with reference to the accompanying drawings, in which.

DETAILED DESCRIPTION OF THE PREFERRED EMBODIMENTS

Preferred embodiments of the present invention will be described in detail below while referring to the accompanying drawings.

In general, a self-diagnosis apparatus for diagnosing a control unit equipped with a pressure sensor constructed according to principles of the present invention comprises a first means for detecting a quantity of change in an output signal from the pressure sensor; a second means for detecting the lapse of a predetermined time after the quantity of change in the output signal of the pressure sensor exceeds a predetermined value; and a third means for diagnosing a failure in the control unit based on the output signal of the pressure sensor after the lapse of the predetermined time from the time the quantity of change in the output signal of the pressure sensor exceeds a predetermined value.

First Embodiment:

A first embodiment of the present invention will be described below with reference to FIG. 1.

First, a description will be made of failure diagnosis or judgment of a pressure sensor itself. FIG. 1 shows a comparison between the failure judgment of a conventional diagnosis apparatus and the failure judgment of a diagnosis apparatus of the present invention, obtained as an output of the pressure sensor changes.

Figure 1:
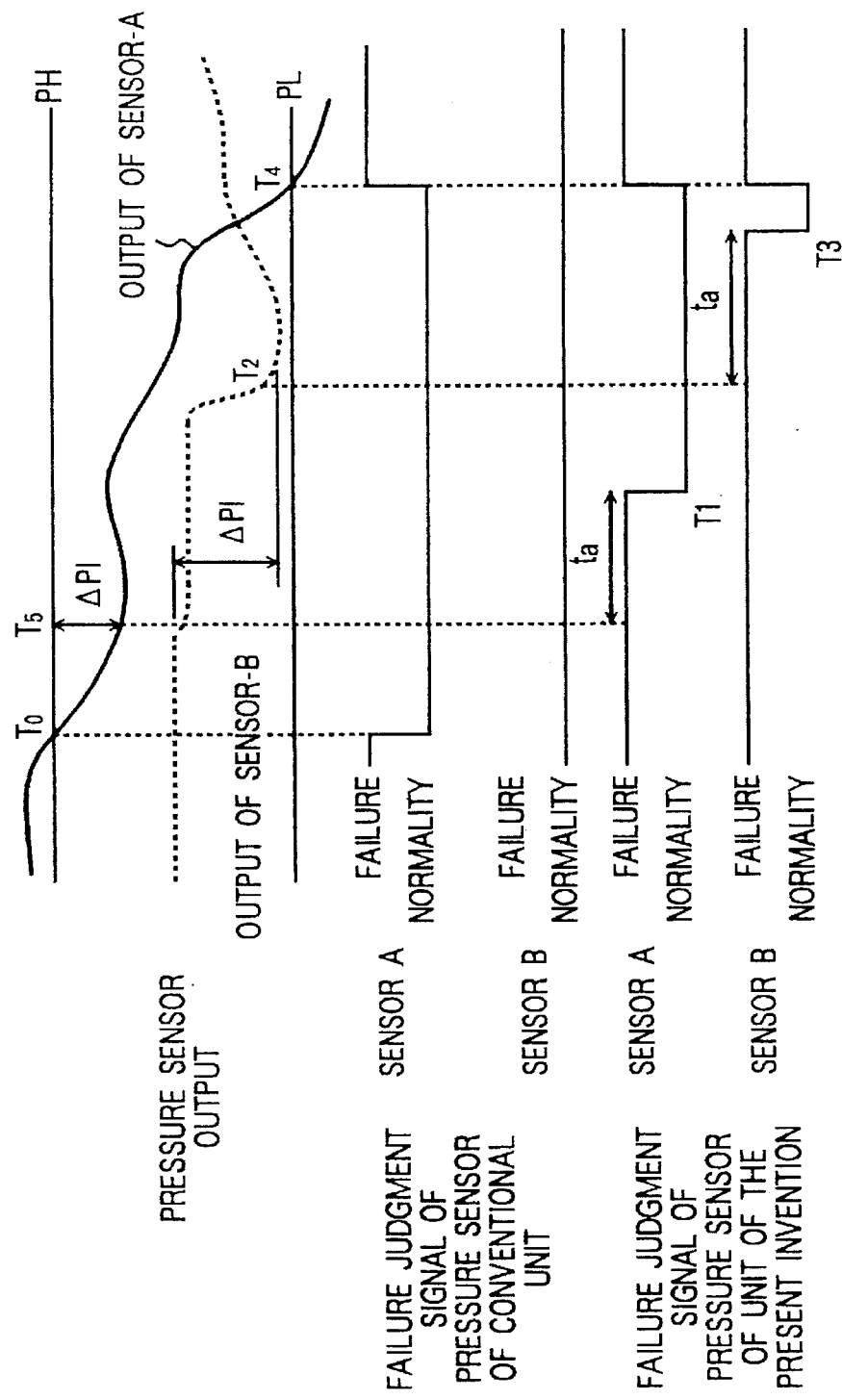
FIG. 1 is a diagram showing failure judgment of a pressure sensor of a first embodiment of the present invention, compared with failure judgment of a conventional pressure sensor.

In FIG. 1, PH and PL represent the upper and lower limit values of a normal output of the pressure sensor, respectively. Circuits on the side of an electric control unit (ECU) are constructed so that the output of the pressure sensor indicates a value greater than PH or a value less than PL when an output line of the pressure sensor is electrically broken or grounded. Also, the values of PH and PL are set to values which do not exist in a normal operation in order to prevent a mistaken detection of failure at the normal operation.

In the case of the conventional unit, when there is an output such as an output of a pressure sensor A, the pressure sensor is judged as failure until time T0 because the output value of the pressure sensor has exceeded the upper limit value of the normal judgment. Between time T0 and time T4 the pressure sensor is judged as normal, and after time T4 the pressure sensor is judged as failure because the output value of the pressure sensor is below the lower limit value of the normal judgment. Also, when there is an output such as an output of a pressure sensor B, the pressure sensor remains judged as normal because the output level of the pressure sensor is between the upper and lower limit values of the normal judgment over the entire area.

On the other hand, in the case of the diagnosis apparatus of the present invention, when there is an output such as an output of the pressure sensor A, the pressure sensor is judged as failure until time T0 and after time T4 where the output value of the pressure sensor exceeds the upper and lower limit values of the normal judgment, as is the conventional diagnosis apparatus. In the area where the pressure sensor output is in the normal state, the pressure sensor output is judged as normal at time T1 when a predetermined period (ta) elapses, after time T5 when the pressure sensor output gets into the normal area and further it is confirmed that the pressure sensor output changes by a predetermined quantity (PI). Also, when there is an output such as an output of the pressure sensor B, the pressure sensor is judged as normal at time T3 when a predetermined period (ta) elapses, after time T2 when it is confirmed that the pressure sensor output changes by a predetermined quantity (PI). In a case where part of ice on the strain gage of the pressure sensor begins to melt, the sensor output often changes largely (at time T2) when all of the ice on strain gage is melted after a slight change in pressure appears temporality as shown at time T5 of the pressure sensor B. For this reason, when the failure judgment of the pressure sensor is made, a pressure sensor change quantity (PI) for judgment needs to be largely set. Also, the aforementioned predetermined time ta likewise needs to be set to time enough for the pressure sensor to output a normal value, after the ice on the strain gage begins to melt and a change appears in the pressure sensor output, then all of the ice is melted, and an unnecessary pressure does not come to be exerted on the strain gage.

Figure 2:
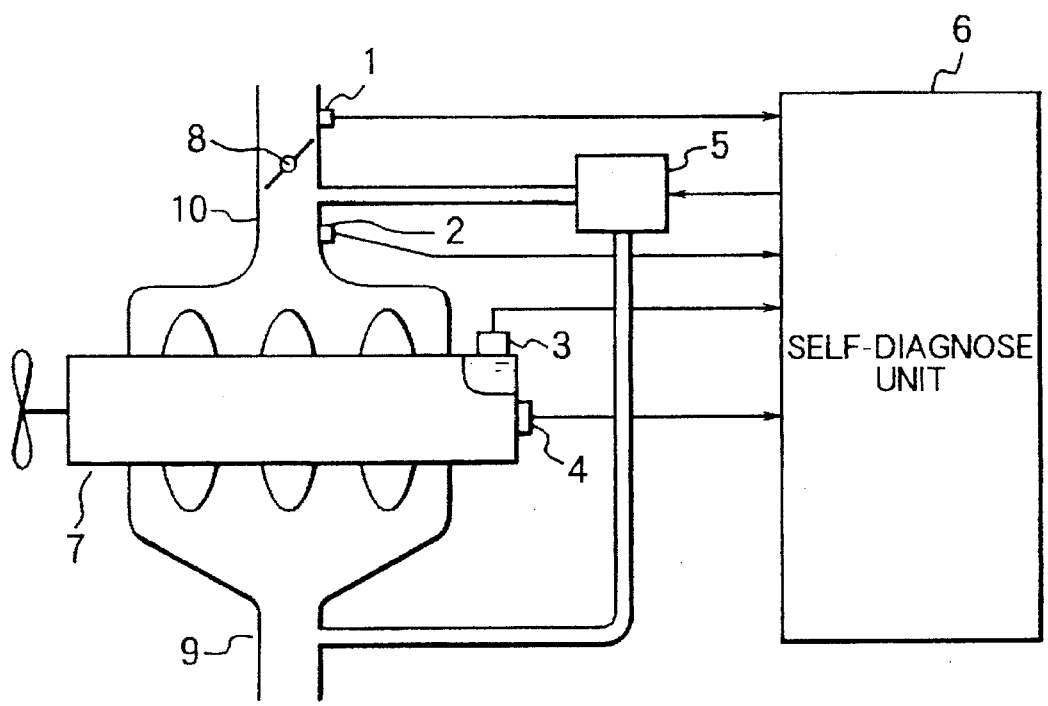
FIG. 2 is a schematic view showing the overall constitution of an EGR control unit, as a second embodiment of the present invention.

Second Embodiment:

Now, a description will hereinafter be made of the failure diagnosis of an EGR control unit while referring to FIG. 2, in which the present invention is applied to diagnosing a failure of the EGR control unit. FIG. 2 schematically illustrates the overall constitution of the EGR control unit along with its associated parts.

In FIG. 2, an engine 7 for an automobile or motor vehicle is provided with an intake passage or pipe 10 and an exhaust passage or pipe 9. A throttle valve 8 is disposed in the intake pipe 10 for controlling the quantity of intake air supplied to the engine 7 through the intake pipe 10. The throttle valve 8 is operatively connected to an accelerator pedal (not shown) so that when the driver of the vehicle manipulates the accelerator pedal, the throttle valve 8 is operated to regulate the quantity of intake air sucked into the engine 7. An intake-air temperature sensor 1 is installed on the intake pipe 10 for sensing the temperature of intake air that is sucked into the engine 7 through the intake pipe 10. A pressure sensor 2 is also mounted on the intake pipe 10 for sensing the pressure of intake air therein. An engine temperature sensor 3 is attached to the main body of the engine 7 for sensing the temperature of an engine coolant in the form of cooling water to detect the idling state of the engine 7 itself. A crankshaft angle sensor 4 is mounted on a crankshaft (not shown) of the engine 7 for sensing the rotational speed of the engine 7. An EGR controller 5 is provided for recirculating the combustion gas from the exhaust pipe 9 to the engine 7 through the intake pipe 10. A self-diagnosis apparatus 6 constructed according to the first embodiment receives information from each of the sensors and performs failure a diagnosis of the EGR control unit which is constituted by the intake air temperature sensor 1, the pressure sensor 2, the engine temperature sensor 3, the crankshaft angle sensor 4, the EGR controller 5 and the self-diagnosis apparatus 6.

Now, the operational principles of the failure diagnosis of the EGR control unit, based on the pressure in the intake pipe 10, will be described while referring to FIG. 3. Initially, a judgment as to whether the EGR control unit is in an EGR check mode is performed based on information from each of the sensors mounted on the main body of the engine 7. In this method, the EGR gas from the engine 7 is forcibly cut and introduced for the failure diagnosis of the EGR control unit, then the degree of a change in the pressure of the intake pipe at that time is monitored, and the EGR controller 5 is actually operated to judge whether the EGR gas has been properly introduced. Then, normally, an operative mode such that a large change appears in the pressure of the intake pipe 10 when the EGR gas is introduced, for example, a deceleration operative mode where less air is supplied to the engine 7 is selected as a check mode in order to enhance detection sensitivity.

Figure 3:
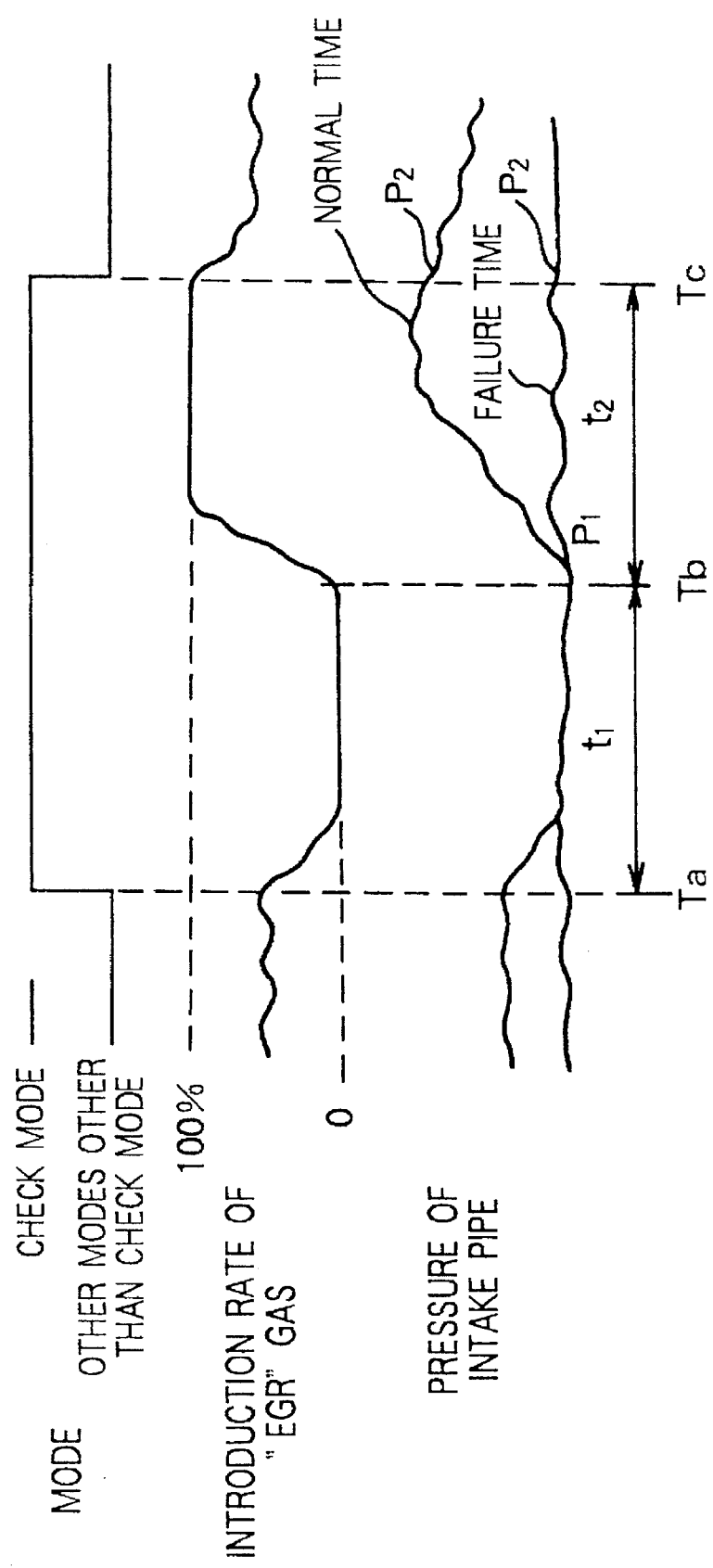
FIG. 3 is a diagram showing the operational principles of the failure diagnosis of the EGR control unit.

In FIG. 3, let us consider a case where the EGR control unit gets into the aforementioned EGR check mode at time Ta. Initially, if the EGR control unit gets into the check mode, the introduction rate of the EGR gas will be forcibly set to 0% and an intake-pipe pressure P1 will be detected at time Tb after the cut state of the EGR gas is held for a period t1 during which the intake-pipe pressure sufficiently becomes stable. Then, the introduction rate of the EGR gas will be forcibly set to 100%. The full introduction state of the EGR gas is held for a period t2 during which the intake-pipe pressure sufficiently becomes stable, and then an intake-pipe pressure P2 is detected at time Tc.

If the EGR control unit is normal, the EGR gas will be regularly introduced into the intake pipe 10 and the intake-pipe pressure will rise because the EGR gas has been in the full introduction state. As a result, the intake-pipe pressure changes as shown by the solid line in the figure, and the change in the pressure, P=P2−P1, largely appears. However, in a case where failure exists in the EGR control unit or system, for example, if the EGR gas is not introduced into the engine due to the blocking of an EGR introduction pipe connecting between the exhaust pipe 9 and the EGR controller 5, the leak of the EGR gas from the EGR introduction pipe, or the inoperation of the EGR controller 5, then the pressure in the intake pipe 10 would not change largely even if the introduction of the EGR gas changed from 0% to 100%, as described above. As a result, the intake-pipe pressure changes as shown by the broken line in the figure, and the change in the pressure, P=P2−P1, hardly appears.

Based on the magnitude of this P, the failure of the EGR control unit is judged. In other words, the failure diagnosis of the EGR control unit is performed by detecting the pressure change quantity of the intake pipe (a relative pressure) before and after the switching control of the EGR passageway.

Figure 4:
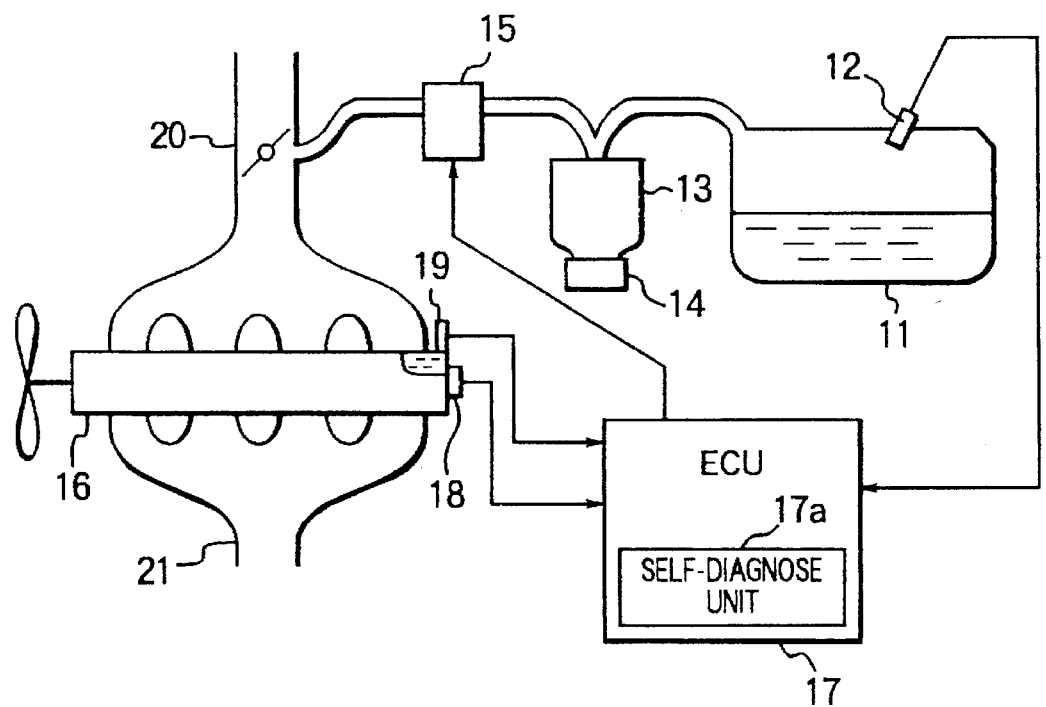
FIG. 4 is a schematic view showing the overall constitution of a purge control unit, as a third embodiment of the present invention.

Third Embodiment:

Now, a description will be made of the failure diagnosis of a purge control unit while referring to FIG. 4, in which the present invention is applied to diagnosing a failure in the purge control unit. FIG. 4 schematically illustrates the overall construction of the purge control unit along with its associated parts.

In FIG. 4, a pressure sensor 12 is installed on a fuel tank 11 for sensing an internal pressure of the fuel tank 11. A canister 13 with an absorbing agent such as activated charcoal received therein is connected to the fuel tank 11 for absorbing a fuel or gasoline gas evaporated from the fuel or gasoline in the fuel tank 11. A valve in the form of a first solenoid valve 14 is provided for opening and closing a passageway between the canister 13 and the atmosphere. A control valve in the form of a second solenoid valve 15 is provided in an engine passageway between the canister 13 and an intake pipe 20 of an automotive engine 16 for supplying the evaporative gas (purge air) absorbed by the canister 13 to the engine 16. An electronic control unit (ECU) 17 including a self-diagnosis apparatus 17a receives outputs of the pressure sensor 12, a crankshaft sensor 18 and a temperature sensor 19. The crankshaft sensor 18 is mounted on a crankshaft of the engine 16 for generating a signal at intervals of a predetermined rotational angle of the crankshaft. The engine temperature sensor 19 senses the temperature of engine coolant in the form of cooling water of the engine 16. The pressure sensor 12, the canister 13, the first and second solenoid valves 14, 15, the ECU 17 including the self-diagnosis apparatus 17, the crankshaft sensor 18 and the engine temperature sensor 19 together constitutes the purge control unit.

Figure 5:
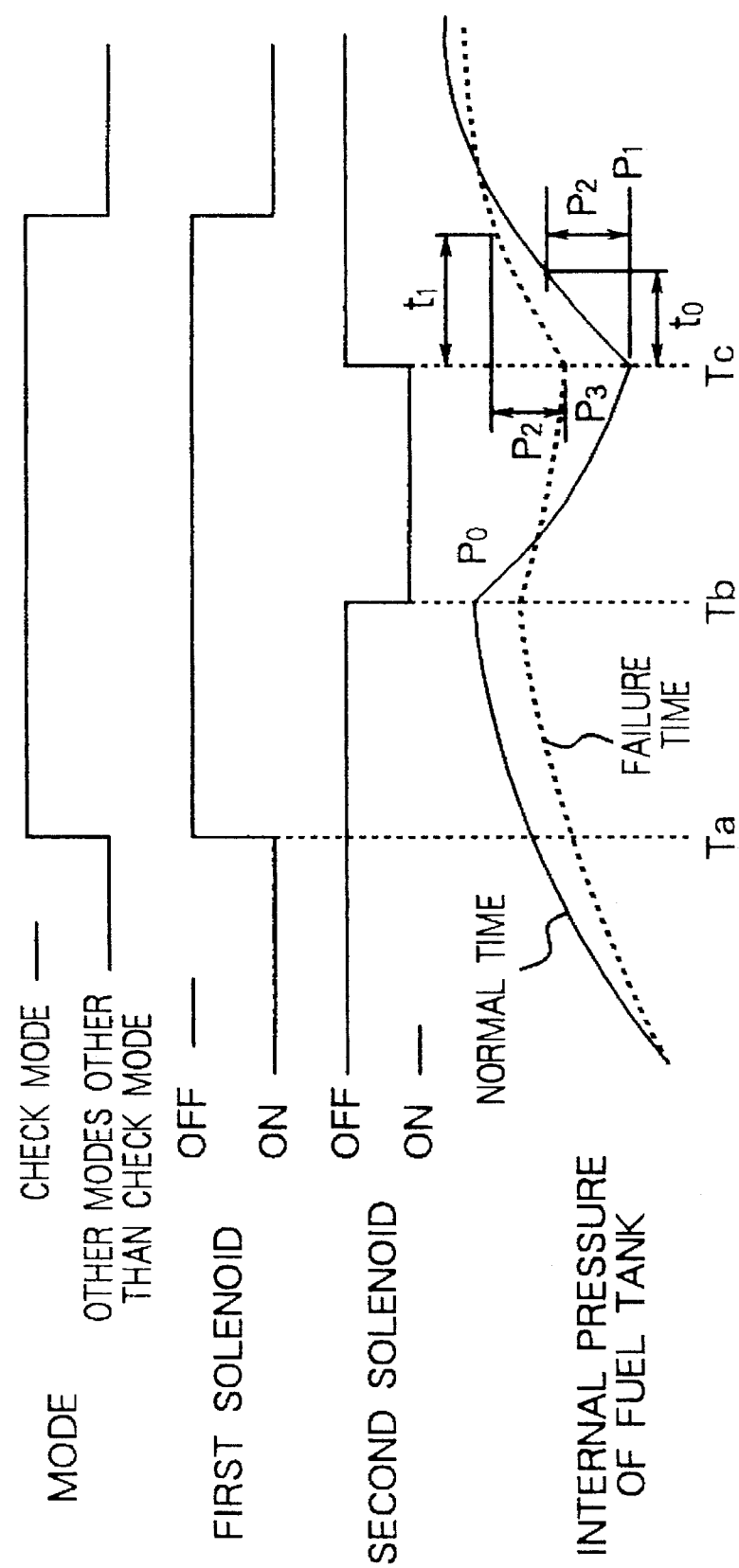
FIG. 5 is a diagram showing the operational principles of the failure diagnosis of the purge control unit.

Now, the operation of the failure judgement of the purge system, based on the internal pressure of the fuel tank 11, will be described according to FIG. 5. The purge air, collected in the fuel tank 11, is absorbed by the activated charcoal in the canister 13. The atmosphere passageway of the canister 13 is normally open to the atmosphere by means of the first solenoid valve 14, but it is an urgent passageway for discharging the purge air outside the canister 13 only when the purge air is abnormally absorbed by the activated charcoal of the canister 13. The ECU 17 of the purge control unit monitors the operative state of the engine, based on information from each of the sensors mounted on the engine 16. If the ECU 17 recognizes that the monitored operative state of the engine 16 is in an operative state where the purge air is absorbed by the canister 13, it will be judged that the operative state is in a purge check mode (time Ta). Then, both solenoid valves 14, 15 are turned off so that the atmosphere passageway of the canister 13 and the engine passageway connecting between the canister 13 and the intake pipe 20 are closed, and consequently, the purge passageway goes to the hermetically sealed state.

With this, the purge air is trapped in the fuel tank 11, and the fuel tank 11 is filled with the purge air. As a result, the pressure in the fuel tank 11 will rise (P0). This state continues for a predetermined period, and then the second solenoid valve 15 is turned on at time Ta so that the purge air in the canister 13 is discharged into the engine 16 for a predetermined period (up to time Tc). As a result, the internal pressure of the fuel tank 11 falls down to a pressure of P1. Thereafter, the second solenoid valve 15 is turned off so that the purge passageway is again closed, and the time (tm) until the internal pressure of the fuel tank 11 exceeds a predetermined pressure (P2) is measured. When the purge control unit is normal, tm becomes t0. On the other hand, if part of the purge passageway from the fuel tank 11 to the engine 16 or if the first solenoid 14 is damaged and therefore the purge air leaks, then tm will become t1 and it will take a time for the internal pressure of the fuel tank 11 to rise.

As described above, the failure of the purge control unit or system can be judged by the length of the pressure rise time (tm). In other words, the failure diagnosis of the purge control unit is performed by detecting the pressure change quantity of the fuel tank 11 (a relative pressure) before and after the switching control of the purge passageway.

Figure 6:
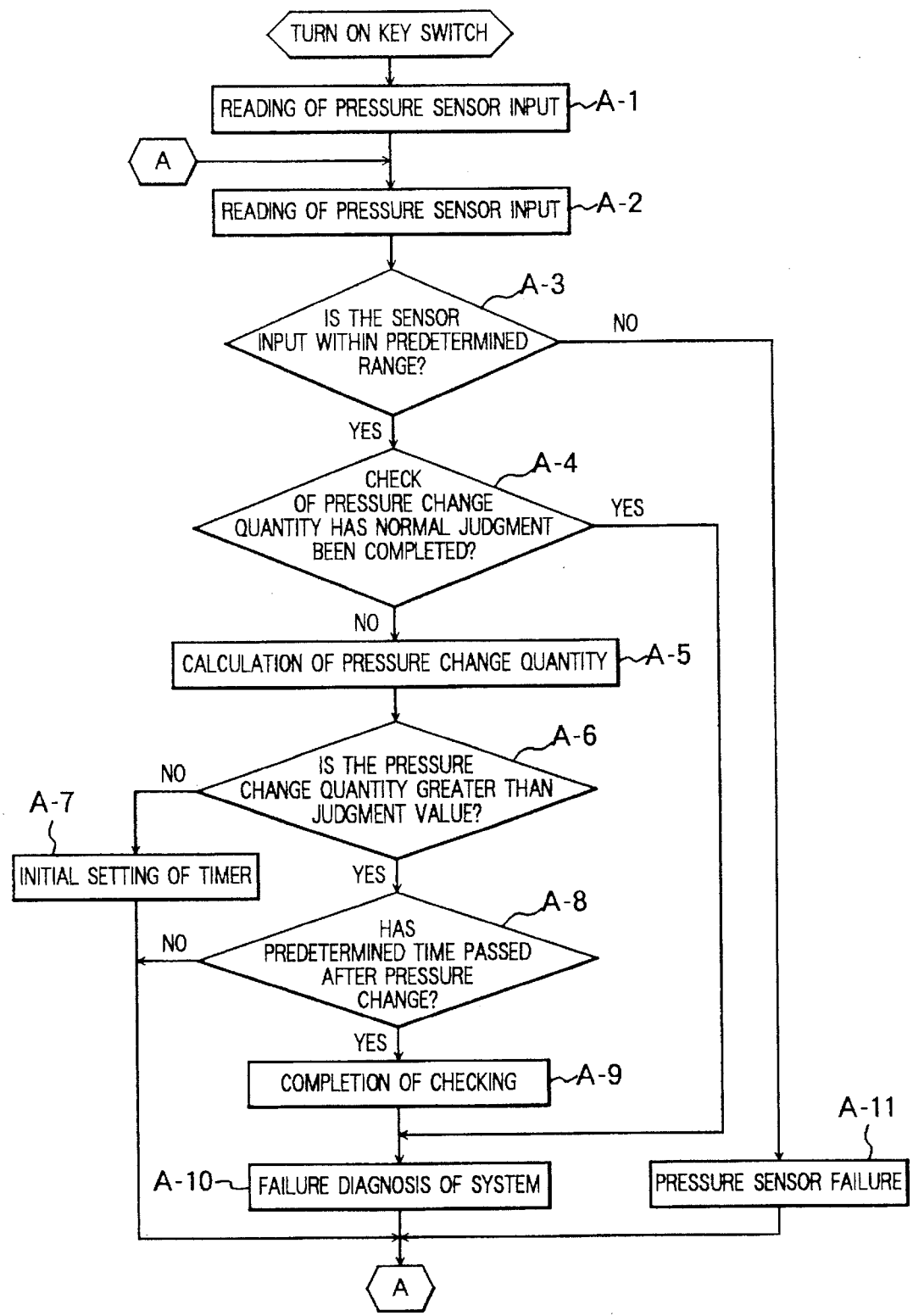
FIG. 6 is a flowchart showing the failure diagnosis of the EGR control unit and the failure diagnosis of the purge control unit.

Now, the control flow of the failure diagnosis in the EGR control unit and the control flow of the failure diagnosis in the purge control unit will be together described according to FIG. 6. Initially, if a key switch is turned on and the ECU 17 is turned on, the output of the pressure sensor 12 will be read in immediately after the key switch is turned on (step A-1) and the output of the pressure sensor 12 will be again read only once immediately after the key switch is turned on (step A-2).

Then, whether the read output value of the pressure sensor 12 is between the upper and lower limit values previously set is judged (step A-3). If the output value of the pressure sensor 12 is outside the range between the aforementioned upper and lower limit values, then the pressure sensor 12 will be judged as failure (step A-11) because the upper and lower limit values have been set to values which cannot exist in an actual use state, and the system failure diagnosis thereafter is not performed.

On the other hand, when the output value of the pressure sensor 12 is between the upper and lower limit values, whether the normal judgment, based on the pressure change quantity, has already been completed is judged (step A-4). In the case of completion, the failure diagnosis of the system is executed (step A-10). In the case of incompletion, a deviation between the output value of the pressure sensor 12 read in step A-1 when the key switch is turned on and the present output value of the pressure sensor 12 read in step A-2 is calculated (step A-5). If this deviation has not exceeded a predetermined value, a check timer will be set to its initial value (step A-7).

This timer is set to time (for example, about 1 to 2 minutes) enough for the output of the pressure sensor 12 to completely become normal, after the ice on the pressure sensor 12 begins to melt and a change appears in the output of the pressure sensor 12. Thereafter, the value of the check timer is counted down in a free run state.

If, on the other hand, the deviation between the output values of the pressure sensor 12 exceeds the aforementioned predetermined value, whether this state continues for a predetermined period, in other words, the value of the check timer is 0 will be judged (step A-8). If the value of the check timer is 0, then the checking, based on the change in the pressure, will be judged as being completed (step A-9). In step A-10 the EGR control unit and the purge control unit are checked according to the sequences of FIGS. 3 and 5, respectively, and then step A-10 again returns to step A-2.

Figure 7:
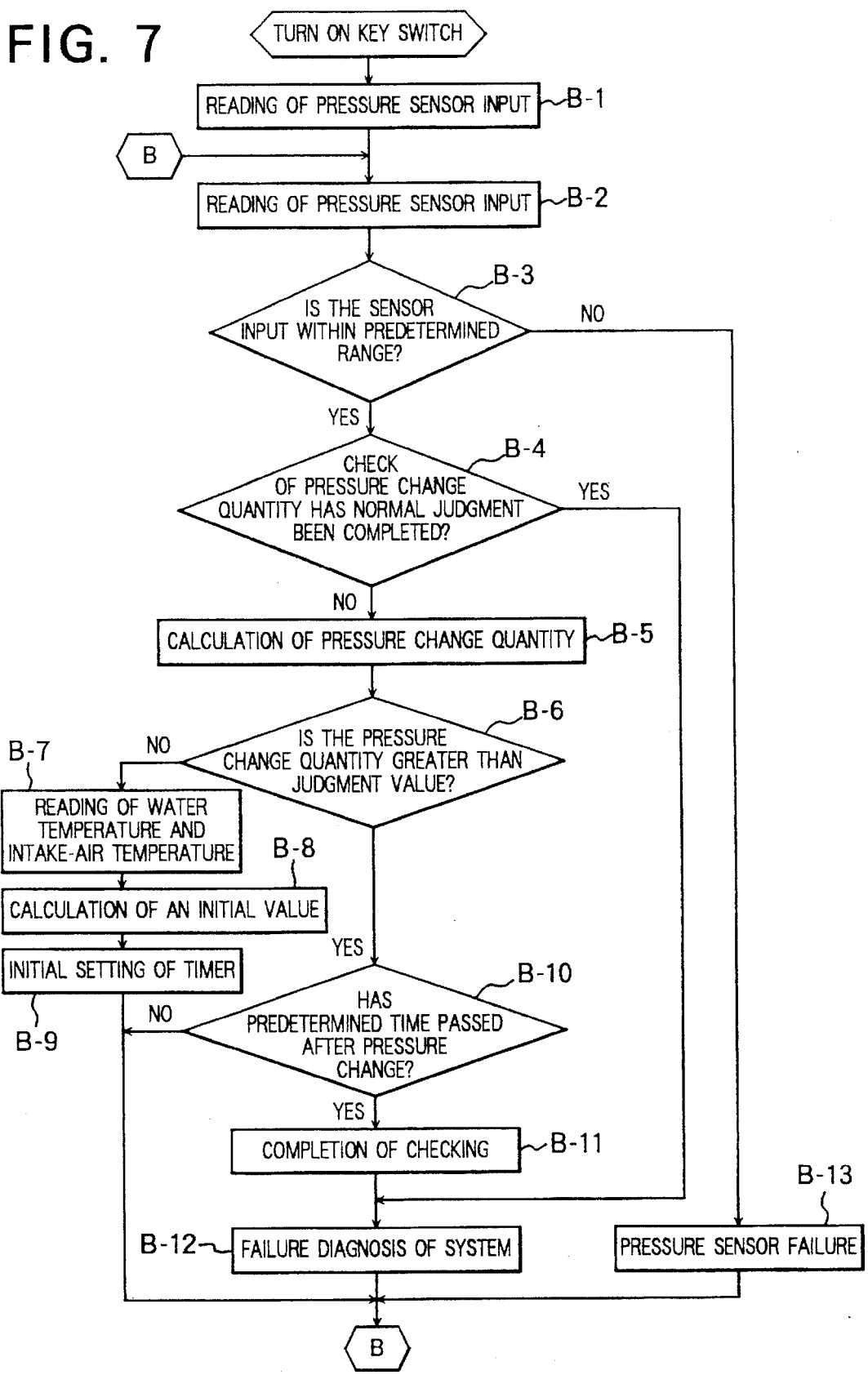
FIG. 7 is a flowchart showing another example of the failure diagnosis, as a fourth embodiment of the present invention.

Fourth Embodiment:

Now, another embodiment of the failure diagnosis will be described according to FIG. 7.

Initially, if the key switch is turned on and the ECU 17 is turned on, the output of the pressure sensor 12 will be read in immediately after the key switch is turned on (step B-1) and the output of the pressure sensor 12 will be again read only once immediately after the key switch is turned on (step B-2).

Then, whether the read output value of the pressure sensor 12 is between the upper and lower limit values previously set is judged (step B-3). The upper and lower limit values are set to the same values as the first embodiment. If the output value of the pressure sensor 12 is outside the range between the aforementioned upper and lower limit values, the pressure sensor 12 will be judged as failure (step B-13), and the system failure diagnosis thereafter is not performed.

On the other hand, when the output value of the pressure sensor 12 is between the upper and lower limit values, whether the normal judgment, based on the pressure change quantity, has already been completed is judged (step B-4). In the case of completion, the failure diagnosis of the system is executed (step B-12). In the case of incompletion, a deviation between the output value of the pressure sensor 12 read in step B-1 when the key switch is turned on and the present output value of the pressure sensor 12 read in step B-2 is calculated (step B-5). If this deviation has not exceeded a predetermined value, the check timer will be set to its initial value (step B-9).

This timer needs to be set to time enough for the output of the pressure sensor 12 to completely become normal, after the ice on the pressure sensor 12 begins to melt and a change appears in the output of the pressure sensor 12. For this purpose, the temperature of the engine cooling water is read in for knowing the temperature of the engine 16 and the intake-air temperature is read in for knowing the temperature of the intake air (step B-7), because the time until the frozen water on the pressure sensor 12 melts completely depends strongly upon the temperature of the engine 16 on which the pressure sensor 12 is mounted and also the temperature of the intake air which passes through the pressure sensor 12. Based on information as to the cooling-water temperature and the intake-air temperature, an initial value of the timer is calculated (step B-8). Since the aforementioned information is information indispensable for controlling the engine 16, the information does not need to be newly added in a case where the failure diagnosis unit has been incorporated in the engine control unit, and consequently, the failure diagnosis unit can be simply realized.

If, on the other hand, the deviation between the output values of the pressure sensor 12 exceeds the aforementioned predetermined value, whether this state continues for a predetermined period, in other words, the value of the check timer is 0 will be judged (step B-10). If the value of the check timer is 0, then the checking, based on the change in the pressure, will be judged as being completed (step B-11). In step B-12 the EGR control unit and the purge control unit are checked according to the sequences of FIGS. 3 and 5, respectively, and then step B-12 again returns to step B-2.

Figure 8:
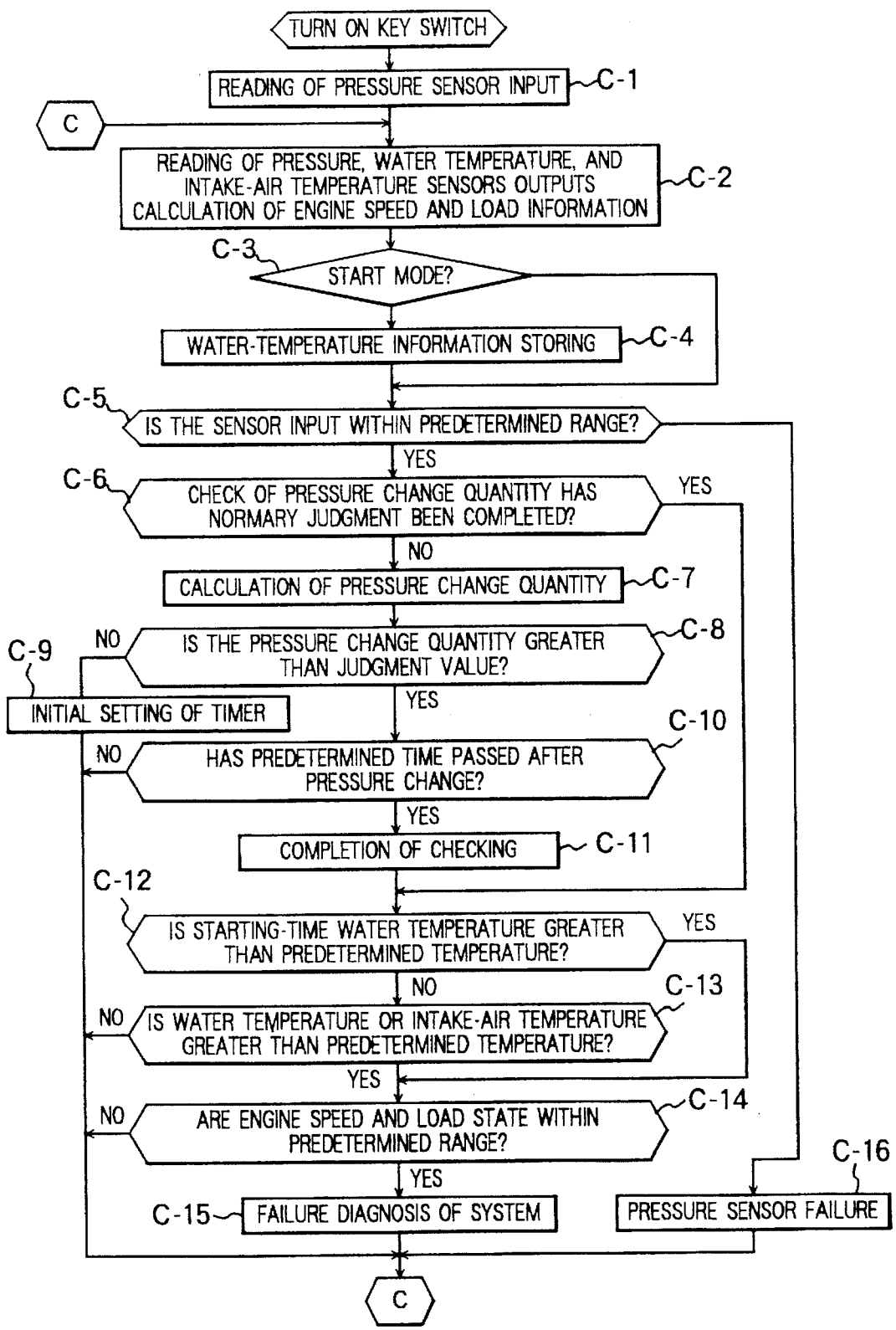
FIG. 8 is a flowchart showing still another example of the failure diagnosis, as a fifth embodiment of the present invention.

Fifth Embodiment:

Now, still another embodiment of the failure diagnosis will be described according to FIG. 8.

Initially, if the key switch is turned on and the ECU 17 is turned on, then the output of the pressure sensor 12 will be read in immediately after the key switch is turned on (step C-1) and the output of the pressure sensor 12 will be again read only once immediately after the key switch is turned on. At the same time, the cooling-water temperature of the engine 16, the intake-air temperature of the engine 16, the rotational speed of the engine 16, and the load information of the engine 16, which are the output signals of the sensors mounted on the engine 16, are read in (step C-2). Thereafter, whether the operative state of the engine 16 is in the starting operative state is judged (step C-3). If the operative state of the engine 16 is in the starting operative state, then the water-temperature information read in the aforementioned step C-2 will be stored as starting-time water-temperature information (step C-4).

Then, whether the output value of the pressure sensor 12 read in the aforementioned step C-2 is between the upper and lower limit values previously set is judged (step C-5). The upper and lower limit values are set to the same values as the first embodiment. If the output value of the pressure sensor 12 is outside the range between the aforementioned upper and lower limit values, the pressure sensor 12 will be judged as failure (step C-16), and the failure diagnosis of the control unit thereafter is not performed.

On the other hand, when the output value of the pressure sensor 12 is between the upper and lower limit values, whether the normal judgment, based on the pressure change quantity, has already been completed is judged (step C-6). In the case of completion, step C-6 advances to step C-12, in which the failure diagnostic judgment of the control unit is performed. In the case of the normal judgment being incomplete, a deviation between the output value of the pressure sensor 12 read in step C-1 when the key switch is turned on and the present output value of the pressure sensor 12 read in step C-2 is calculated (step C-7). If this deviation has not exceeded a predetermined value, the check timer will be set to its initial value (step C-9). If, on the other hand, the deviation between the output values of the pressure sensor exceeds the aforementioned predetermined value, whether this state continues for a predetermined period, in other words, the value of the check timer is 0 will be judged (step C-10). If the value of the check timer is 0, then the checking, based on the change in the pressure, will be judged as being completed (step C-11). Then, step C-11 advances to step C-12.

In step C-12 whether the starting-time water temperature read in the aforementioned step C-4 has exceeded a predetermined value is judged. If the water temperature is greater than the predetermined value, step C-12 will advance to step C-14. If, on the other hand, the water temperature is less than the predetermined value, step C-12 will advance to step C-13. In step C-13, if either the present intake-air temperature or the water temperature read in step C-2 is less than a predetermined value, then step C-13 will return to step C-2 without executing the failure diagnosis. The starting-time water temperature for the aforementioned judgment and the intake-air and water temperatures for the present judgment are set to temperatures higher than a temperature at which water normally freezes. Only in a case where the operation of the engine is started at the state where water does not freeze and thereafter the temperature of the intake pipe on which the pressure sensor 12 is mounted has not fallen, the checking of the control unit is performed.

In step C-14 whether the rotational speed and the load state of the engine 16 are within a predetermined range is checked. If the rotational speed and the load state are within the predetermined range, step C-14 will advance to step C-15. In step C-15 the failure diagnosis of the EGR control unit and the failure diagnosis of the purge control unit are executed according to the sequences of FIGS. 3 and 5, respectively, and step C-15 again returns to step C-2. When the rotational speed and the load is within the predetermined range, the engine is in a condition where combustion gas in the engine 16 is burned properly and also the engine 16 is operating without being cooled down by wind. In such a condition, an operative area where the area of the measurement of the pressure sensor 12 becomes optimum in respect of accuracy is obtainable as shown in FIG. 9. When the failure diagnosis is performed under this condition, reliability in the failure diagnosis would be maintained even if an inexpensive pressure sensor whose absolute accuracy is low were used.

Figure 9A:
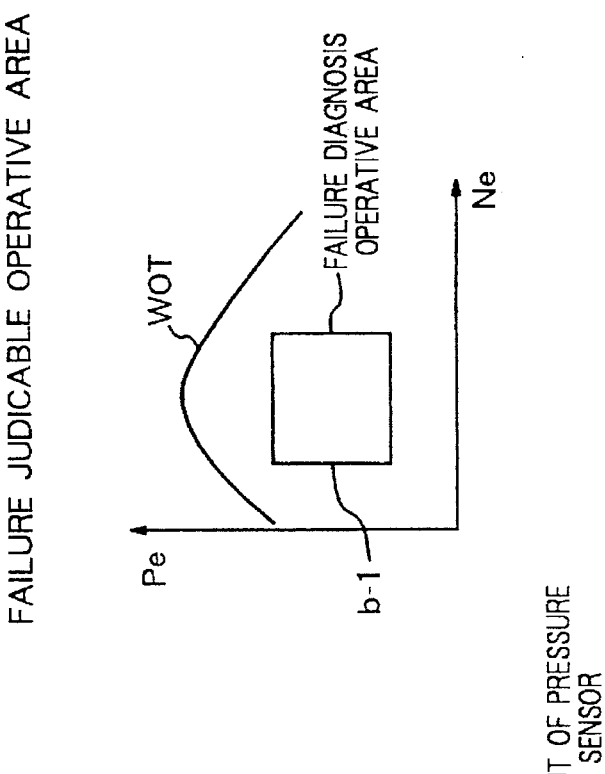
FIG. 9(a) is a diagram showing a pressure sensor output range for the failure diagnosis of the fifth embodiment.
Figure 9B:
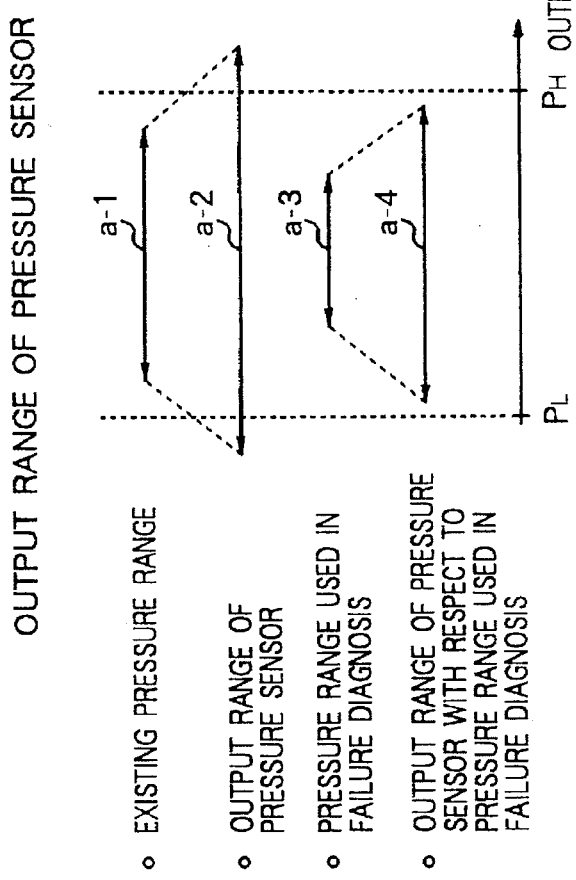
FIG. 9(b) is a diagram showing an engine operating range for the failure diagnosis of the fifth embodiment.

FIG. 9(a) shows the output range of the pressure sensor. In FIG. 9(a), reference character a-1 represents an actually existing pressure range, and reference character a-2 represents the output range of the pressure sensor with respect to the actually existing pressure range. Reference character a-3 represents a pressure range which is used in the failure diagnosis, and reference character a-4 represents the output range of the pressure sensor with respect to the pressure range which is used in the failure diagnosis. Also, in FIG. 9(b) the number of revolutions of the engine is taken in the axis of abscissa and the pressure of the intake pipe is taken in the axis of ordinate. The operative area of the failure diagnosis, which is used in this embodiment, is shown by an enclosed area, b-1.

Note that, when a pressure sensor whose absolute accuracy is low is used, a system failure judgment can also be performed, after the range between the upper and lower judgment values of the pressure sensor in the aforementioned step C-5 are set to a slightly narrowed range in view of variation in the sensor output and it is confirmed that there is no sign of the freezing and the broken line of the pressure sensor.

While the invention has been described with reference to specific embodiments thereof, it will be appreciated by those skilled in the art that numerous variations, modifications, and embodiments are possible, and accordingly, all such variations, modifications, and embodiments are to be regarded as being within the scope of the invention.

What is claimed is:

1. A self-diagnosis apparatus for diagnosing a control unit equipped with a pressure sensor, said apparatus comprising:

first means responsive to a start of operation of said self-diagnosis apparatus for detecting a quantity of change in an output signal from said pressure sensor;

second means for detecting the lapse of a predetermined time after the quantity of change in the output signal of said pressure sensor exceeds a predetermined value; and third means for diagnosing a failure in said control unit based on the output signal of said pressure sensor after the lapse of said predetermined time from the time the quantity of change in the output signal of said pressure sensor exceeds a predetermined value.

2. The self-diagnosis apparatus as set forth in claim 1, wherein said control unit is an exhaust gas recirculation (EGR) control unit, said EGR control unit comprising an EGR passageway for recirculating an exhaust gas of an engine from an exhaust pipe to an intake pipe, and an EGR controller provided in said EGR passageway for controlling a quantity of EGR gas which is supplied to said engine through said EGR passageway, said pressure sensor being mounted on said intake pipe for detecting a pressure of intake air in said intake pipe.

3. The self-diagnosis apparatus as set forth in claim 1, wherein said control unit is a purge control unit, said purge control unit comprising a purge passageway for supplying a fuel gas evaporated in a fuel tank to an intake pipe of an engine, a canister disposed in said purge passageway with an absorbing agent received therein for absorbing and collecting the evaporated fuel gas, and a control valve disposed in said purge passageway for controlling the supply of the evaporated fuel gas from said canister to said intake pipe, said pressure sensor detecting an internal pressure of said fuel tank.

4. The self-diagnosis apparatus as set forth in claim 3, wherein the time at which the failure diagnosis starts is changed depending upon a temperature of said engine or a temperature of intake air in said intake pipe.

5. The self-diagnosis apparatus as set forth in claim 4, wherein said failure diagnosis is performed when said engine temperature or intake air temperature is higher than a predetermined temperature.

6. The self-diagnosis apparatus as set forth in claim 4, wherein said failure diagnosis is performed when said engine temperature or intake air temperature is higher than a predetermined temperature.

7. The self-diagnosis apparatus as set forth in claim 2, wherein the time at which the failure diagnosis starts is changed depending upon a temperature of said engine or a temperature of intake air in said intake pipe.

8. The self-diagnosis apparatus as set forth in claim 7, wherein said failure diagnosis is performed when said engine temperature or intake air temperature is higher than a predetermined temperature.

* * * * *